US 11,434,434 B2

(12) United States Patent
Jani et al.

(10) Patent No.: US 11,434,434 B2
(45) Date of Patent: Sep. 6, 2022

(54) METAL REMOVAL FROM FLUIDS

(71) Applicant: Baker Hughes, a GE company, LLC, Houston, TX (US)

(72) Inventors: Jagrut Jani, Sugar Land, TX (US); Tran M. Nguyen, Houston, TX (US); Jerry J. Weers, Richmond, TX (US); Zhengwei Liu, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

(21) Appl. No.: 17/486,689

(22) Filed: Sep. 27, 2021

(65) Prior Publication Data
US 2022/0010222 A1    Jan. 13, 2022

Related U.S. Application Data

(62) Division of application No. 16/573,401, filed on Sep. 17, 2019, now Pat. No. 11,130,918.

(51) Int. Cl.
| C10G 29/28 | (2006.01) |
| B01D 17/04 | (2006.01) |
| C10G 53/04 | (2006.01) |
| C10G 71/00 | (2006.01) |

(52) U.S. Cl.
CPC ............ *C10G 29/28* (2013.01); *B01D 17/047* (2013.01); *C10G 53/04* (2013.01); *C10G 71/00* (2013.01); *C10G 2300/205* (2013.01); *C10G 2300/304* (2013.01); *C10G 2300/80* (2013.01)

(58) Field of Classification Search
CPC .... C10G 29/28; C10G 2300/80; C10G 53/04; C10G 71/00; C10G 2300/205; C10G 2300/304; B01D 17/047
See application file for complete search history.

(56) References Cited

U.S. PATENT DOCUMENTS

| 3,755,161 | A  | 8/1973  | Yokota et al. |
| 6,117,333 | A  | 9/2000  | Frankiewicz et al. |
| 8,524,074 | B2 | 9/2013  | Braden et al. |
| 8,992,769 | B2 | 3/2015  | O'Rear et al. |
| 9,234,141 | B2 | 1/2016  | O'Rear et al. |
| 9,267,082 | B2 | 2/2016  | Braden et al. |
| 9,447,675 | B2 | 9/2016  | Yean et al. |
| 9,523,043 | B2 | 12/2016 | O'Rear et al. |
| 9,598,648 | B2 | 3/2017  | O'Rear et al. |
| 9,611,434 | B2 | 4/2017  | Morgan et al. |
| 10,179,879 | B2 | 1/2019 | O'Rear et al. |
| 10,179,880 | B2 | 1/2019 | O'Rear et al. |
| 2011/0076246 | A1 | 3/2011 | Haley et al. |
| 2011/0172473 | A1 | 7/2011 | Nguyen et al. |
| 2015/0068749 | A1 | 3/2015 | Wernimont et al. |
| 2015/0068950 | A1 | 3/2015 | See et al. |

OTHER PUBLICATIONS

Ma, Lun, et al., "A new Cu-cystemine complex: structure and optical properties", Journal of Materials Chemistry C., Mar. 31, 2014, vol. 2, No. 21, 4239-4246.

ALCO Chemical "Aquamet T Trithiocarbonate Metal Precipitant for Metal Removal in Wastewater Treatment and Metal Recovery", Dec. 14, 1999, 8 pages.

*Primary Examiner* — Thuan D Dang
(74) *Attorney, Agent, or Firm* — Mossman, Kumar & Tyler, P.C.

(57) ABSTRACT

Metals, such as mercury, may be removed from aqueous, hydrocarbon, or mixed oilfield or refinery fluids by: applying a sulfur compound having the general formula HS—X, where X is a heteroatom substituted alkyl, cycloalkyl, aryl, and/or alkylaryl group either alone or in combination with or as a blend with at least one demulsifier, a buffering agent, a pour point depressant, and/or a water clarifier to chelate the at least one metal and form a chelate complex of the sulfur compound with the at least one metal and then separating the chelate complex from the fluid.

16 Claims, No Drawings

METAL REMOVAL FROM FLUIDS

CROSS-REFERENCE TO RELATED APPLICATION

This application is a divisional application from U.S. patent application Ser. No. 16/573,401 filed Sep. 17, 2019, and issued as U.S. Pat. No. 11,130,918 on Sep. 28, 2021, incorporated herein by reference in its entirety.

TECHNICAL FIELD

The present invention relates to additives and methods for removing metals from various oilfield and refinery fluids, and more particularly relates to the removal of metals, such as mercury, from oilfield and refinery fluids by introducing a sulfur compound alone or in combination with at least one demulsifier, a water clarifier, a buffering agent and/or a pour point depressant to the fluids to separate the metals from the fluid.

BACKGROUND

The removal of metals found in oil and natural gas streams, such as lead, mercury, copper, iron, magnesium, sodium, molybdenum, zinc, cadmium, vanadium, titanium, manganese, chromium, cobalt, antimony, uranium, aluminum, tin, barium, gallium, silver, calcium, lithium, and arsenic, is an important element to oil and gas production and refining.

The presence of such metals can cause problems during the processing and refining of hydrocarbon streams and significantly reduce their value and the markets into which hydrocarbons may be sold. Moreover, many of these metals, such as mercury, are toxic and pose an environmental risk, making the treatment and disposal of industrial fluid streams containing them challenging.

Various technologies and methods have been employed over the years to try to effectively removal of metals from oilfield and refinery fluids. Prior methods of mercury removal from hydrocarbon streams, for example, have utilized dithiocarbamate additives, filtration, thermal processes, and oxidation. However, such removal methods are often hindered by the interference from water, other solids, and oil emulsions and/or interfaces present in the stream. In addition, dithiocarbamate chemistries are known to be toxic and can generate undesirable rag layers during treatment, which increases processing time and expense.

Therefore, it would be desirable to develop metal removal additives and methods that are less toxic and more efficient in separating metals from oilfield and refinery fluids.

SUMMARY

There is provided, in one form, a method of removing metals from a fluid comprising: applying a sulfur compound having the general formula HS—X, where X is a heteroatom substituted alkyl, cycloalkyl, aryl, and/or alkylaryl group, to an aqueous, hydrocarbon, or mixed fluid containing at least one metal to chelate the at least one metal and form a chelate complex of the sulfur compound with the at least one metal, and separating the chelate complex from the fluid via, for example, solids disposal or water washing. In one non-restrictive embodiment, at least one demulsifier, a buffering agent, a water clarifier, and/or a pour point depressant may be further applied to the fluid with the sulfur compound in a blend or separately.

There is also provided, in another form, a treated fluid in which a fluid comprising at least one metal is combined with an additive comprising (1) a sulfur compound having the general formula HS—X, where X is a heteroatom substituted alkyl, cycloalkyl, aryl, and/or alkylaryl group, and (2) a component selected from the group consisting of at least one demulsifier, a buffering agent, a water clarifier, a pour point depressant, and combinations thereof. The at least one metal to be removed may be lead, mercury, copper, iron, magnesium, sodium, molybdenum, zinc, cadmium, vanadium, titanium, manganese, chromium, cobalt, antimony, uranium, aluminum, tin, barium, gallium, silver, arsenic, selenium, calcium, lithium, silicon and combinations thereof. The fluid to be treated may be selected from a group consisting of crude oil, an oilfield condensate, liquified petroleum gas, natural gas liquid, propane, butane, a refinery distillate, a residual fuel, storage tank sludge, a coke product, natural gas, refinery fuel gas, wastewater, produced water, a chemical process fluid, and combinations thereof. In one non-limiting embodiment, the treated fluid additionally comprises a chelate complex of the sulfur compound with the at least one metal.

DETAILED DESCRIPTION

It has been discovered that adding a sulfur compound having the general formula HS—X, either by itself or with at least one demulsifier, a buffering agent, a pour point depressant, and/or a water clarifier, to an oilfield or refinery fluid having at least one metal, such as crude oil, is useful in separating (i.e. removing) the at least one metal from the fluid. More specifically, it has been discovered that a sulfur compound of the kind(s) described herein is useful to chelate the at least one metal present in the fluid and form a chelate complex with the at least one metal so that the at least one metal may be more easily removed or separated from the fluid.

The sulfur compound is a compound having the general formula HS—X, in which X is a heteroatom substituted alkyl, cycloalkyl, aryl, and/or alkylaryl group. The heteroatom may be oxygen, sulfur, phosphorous, and/or nitrogen. The alkyl, cycloalkyl, aryl, or alkylaryl groups may have from 1 independently to 12 carbon atoms; alternatively from 2 independently to 6 carbon atoms. As used herein with respect to a range, "independently" means that any threshold given may be used together with any other threshold given to provide a suitable alternative range. Non-limiting examples of sulfur compounds falling within this formula that are effective in removing (i.e. separating) metals from a fluid when applied to the fluid are, without limitation, 2-mercaptoethanol, bis (2-mercaptoethyl) sulfide, 2-mercaptoethyl disulfide, 1,8-dimercapto-3,6-dioxaoctane, mercaptoacetic acid, glyceryl monothioglycolate, 2-mercaptophenol, 4-mercaptophenol, 1,2 dithioethane, cysteamine, N,N dimethyl cysteamine, N,N'-bis(2-mercaptoethyl) ethylenediamine, thiolactic acid, 1, 3, 5 triazine, 2,4,6 trithiol. In one non-limiting embodiment, the additive to be applied to the fluid containing at least one metal may be comprised of one or more of these sulfur compounds.

In another non-limiting embodiment, the additional components may be applied to the fluid containing at least one metal to improve separation or removal. The components that may be applied in addition to the sulfur compound described above comprise a buffering agent, at least one demulsifier, a pour point depressant, and/or a water clarifier. These additional components may be blended with the sulfur compound or each other before being applied to the fluid or be added to the fluid separately in combination with the sulfur compound or in combination with each other.

A buffering agent may be applied to change pH of the fluid and enhance the metal removal. Suitable buffering agents include, without limitation, glycolic acid, acetic acid, lactic acid, and combinations thereof.

Because demulsifiers work to break water-in-oil or oil-in water emulsions in fluid containing hydrocarbons, the application of at least one demulsifier to a hydrocarbon fluid may help release the metal particle complex created by the sulfur compound from the oil phase of the fluid. Suitable demulsifiers include, but are not limited to, oxyalkylated phenolic resins, oxyalkylated alkyl phenol formaldehyde resins, benzenesulfonic acid, 4-C10-13-sec-alkyl derivatives, bis(2-ethylhexyl) sulfosuccinate sodium salt, phenol (para C4-C12 alkyl) bis polymer with (chloromethyl)oxirane methyloxirane and oxirane, methyloxirane polymers with oxirane, propoxylated or ethoxylated polyamines, and combinations thereof. It has also been shown that the at least one demulsifier may be a complex blend of crosslinked polyols, oxyalkylated phenolic resins, alkylarylsulfonic acid, polyol esters, and combinations of these. In the case of treating a hydrocarbon fluid for metal removal, pour point depressants may be applied with the at least one demulsifier to help avoid crystallization of paraffins in the hydrocarbon fluid and aid in separating metals from the hydrocarbon phase of fluid. The pour point depressants that may be applied include, without restriction, ethylene vinyl acetate copolymers, polyacrylamide copolymers and terpolymers, olefin maleic copolymer esters, and/or polyacrylate homopolymers, copolymers, and terpolymers, such as methacrylate homopolymers, copolymers, and terpolymers.

The water clarifier that may be applied may, without limitation, be one or more of the following: a cationic starch aqueous carbohydrate dispersion, a water-soluble modified starch, chitosan acetate, aluminum chloride hydroxide cationic polyacrylamide, an anionic polysulfonated copolymer, and a quaternized polytriethanolamine polymer.

In some non-limiting embodiments, certain optional chelants and ionic liquids may also be added to the fluid to help effect precipitation of the metals, especially in the case of removal or separation of mercury. Examples of such chelants include, without limitation, sodium trithiocarbonate, N,N dimethyl dithiocarbamate, polyammonium dithiocarbamate, and/or sodium, potassium or ammonium thiocyanate.

The fluid to be treated with such an additive is any fluid that contains at least one metal. The metals present in the fluid may be selected from the group consisting of lead, mercury, copper, iron, magnesium, sodium, molybdenum, zinc, cadmium, vanadium, titanium, manganese, chromium, cobalt, antimony, uranium, aluminum, tin, barium, gallium, silver, arsenic, selenium, calcium, lithium, silicon, and combinations thereof. The fluid may be (1) an aqueous fluid, where the continuous phase is water or brine and where the fluid contains more than 50% by volume of water or brine, (2) a hydrocarbon fluid, where the continuous phase is a hydrocarbon liquid or hydrocarbon gas and where the fluid contains 50% or more by volume of hydrocarbon or (3) a fluid containing a mixture or combination of water and hydrocarbons. Such fluids may found in oilfield and refinery environments and may include, but are not necessarily limited to, crude oil, an oilfield condensate, liquified petroleum gas, natural gas liquid, propane, butane, a refinery distillate, a residual fuel, storage tank sludge, a coke product, natural gas, refinery fuel gas, wastewater, produced water, a chemical process fluid, and combinations thereof. It will be appreciated that, in the case of treating an aqueous fluid, an additive comprising the sulfur compound alone may be effective in removing metals from the fluid.

Once the additive has been applied to the fluid, been given time to mix with the fluid, and the treated fluid is allowed to settle, the sulfur compound and the at least one metal may be separated or removed from the fluid. Without being limited to any particular mechanism or explanation, it is believed that the sulfur compound chelates the at least one metal, thereby forming a chelate complex that can be separated or removed from the fluid. For purposes is this disclosure, the terms "separation," "separating," "removal," and "removing" are synonymous. By "removing" or "separating" a metal from a fluid means any and all partitioning, sequestering, separating, transferring, eliminating, dividing, removing, dropping out of the metal from the fluid to any extent. In one embodiment, this separation and removal can be accomplished by directing the treated fluid to a water wash to have the metal transferred to a water stream for further treatment or disposal. Alternatively, or additionally, this separation may be carried out by directing the treated fluid to a centrifuge or filter for the metal to be removed from the sulfur compound as a disposable solid. That is, separating the chelate complex (i.e. the combination of the sulfur compound and the at least one metal) may be carried out by a process selected from the group consisting of centrifuging, filtering, air flotation, gravity separation, distillation, adsorption, electrophoresis, and combinations thereof, and combinations thereof.

A goal of the method is to separate the metal from the fluid to an acceptable level for the fluid to be properly processed, discharged to the environment, or reused. While complete separation of metals is desirable, it should be appreciated that complete separation is not necessary for the methods and additives discussed herein to be considered effective. Success is obtained if more metals are separated from the fluid using an effective amount of components of the present disclosure than in the absence of an effective amount of them. In a non-limiting embodiment, the amount of the sulfur compound effective for metal removal may range from about 1 ppm to about 500 ppm per ppm of the at least one metal in the fluid, the amount of the optional at least one demulsifier in the additive may range from about 1 ppm to about 500 ppm based on total volume of the fluid, the amount of the optional pour point depressant may range from about 15 ppm to about 2000 ppm based on the total volume of the fluid, and the amount of the optional water clarifier in the additive may range from about 0.1 ppm to about 200 ppm based on the total volume of the fluid.

The invention will be illustrated further with reference to the following Examples, which are not intended to limit the invention, but instead illuminate it further.

Examples

The data in Tables 1, 2, 3, 4, 5, and 6 show the results of bottle testing various metal removal additives of the kinds described herein when they are applied to samples of oilfield condensate, South American Crude Oil Storage Tank Bottoms, crude oil, and raw crude oil to evaluate their performance in removing mercury from the samples tested.

Table 1 reflect the results from a series of botte tests of 100 ml samples of oilfield condensates containing no added water. The 100 ml sample of oilfield condensate was placed in a 100 ml centrifuge tube and treated with various doses of the metal removal additives identified in Table 1 below. Each treated sample was shaken by hand 100 times and then allowed to settle at room temperature for 1 hour. After the settling period, an aliquot of oil was taken from the mid-level of the tube for mercury analysis. Additives were then evaluated for how well they removed mercury in the sample prior to and after a water wash procedure.

For purposes of the Tables below, the "demulsifier" is formaldehyde, polymer with 4-nonylphenol and oxirane, WC1 is a cationic aqueous carbohydrate dispersion, WC2 is a water-soluble modified starch, WC3 is an aluminum chloride hydroxide/acrylamide copolymer, and WC4 is a water-soluble modified starch. Benzenesulfonic acid, 4-C10-13-sec-alkyl derivs. is another demulsifier additive that was evaluated. A clear cell indicates that no measurement was taken for that sample at that point in the evaluation.

TABLE 1

Hg Removal Test Results—Oilfield Condensate Samples (No Added Water)

| Additive(s) | Dosage of additives (ppm-v) | Oil Mercury Content- No Water Wash Procedure (ppb) | Oil Mercury Content- With Water Wash Procedure (ppb) |
|---|---|---|---|
| Untreated hydrocarbon | | 669 | 669 |
| 2-mercaptoethanol | 100 | 623 | 86 |
| 2-mercaptoethanol + demulsifier | 50 + 50 | | 74 |
| 2-mercaptoethanol + demulsifier + WC1 | 50 + 50 + 20 | | 58 |
| 2-mercaptoethanol + demulsifier + WC2 | 50 + 50 + 20 | | 35 |
| 2-mercaptoethanol + demulsifier + WC3 | 84 + 15 + 1 | | 36 |
| Mercaptoacetic acid | 100 | 58 | 25 |
| Mercaptoacetic acid + demulsifier | 50 + 50 | 167 | 32 |
| Mercaptoacetic acid + demulsifier + WC4 | 50 + 50 + 20 | | 66 |
| Mercaptoacetic acid + Benzenesulfonic acid, 4-C10-13-sec-alkyl derivs. | 50 + 50 | 172 | 176 |
| Mercaptoacetic acid + Benzenesulfonic acid, 4-C10-13-sec-alkyl derivs. + demulsifier | 50 + 50 + 50 | | 210 |
| Benzenesulfonic acid, 4-C10-13-sec-alkyl derivs. | 100 | 409 | |
| 1,8-dimercapto-3,6-dioxaoctane | 100 | 528 | 470 |
| 1,8-dimercapto-3,6-dioxaoctane + demulsifier | 50 + 50 | | 537 |

Table 2 shows the results from a second series of bottle tests in which 5 ml of deionized water is added to 95 ml of the oilfield condensate sample and then treated with various sulfur compounds of the kinds described herein and 50 ppm of the demulsifier. In this evaluation, after addition of all materials to the tube, the tube was shaken by hand 100 times. After shaking the sample, it was placed in a centrifuge set at 1300 rpm for 5 minutes. After the centrifuge treatment, an oil sample was taken from the mid-level of the tube for mercury analysis.

TABLE 2

Hg Removal Test Results-Oilfield Condensate Samples (w/Added Water)

| Additive(s) | Dosage of additives (ppm-v) | Hg Content (ppb) |
|---|---|---|
| Untreated hydrocarbon | | 669 |
| 2-mercaptoethanol + demulsifier | 50 + 50 | 74 |
| Mercaptoacetic acid + demulsifier | 50 + 50 | 65 |
| 1,8-dimercapto-3,6-dioxaoctane + demulsifier | 50 + 50 | 537 |

Table 3 shows the bottle test results when samples of South American Crude Oil Storage Tank Bottoms having a wax content of 6%, a water content of 2%, a solids content of 0.8%, and an emulsion content of 0.8% was treated with various mercury removal additives of the kinds described herein. For this set of bottle tests, all of the hydrocarbon fluid samples were placed in a graduated 100 ml centrifuge tube and dosed with 200 ppm of an olefin maleic copolymer ester crude oil pour point additive. The mercury reduction additive was then added and the mixture shaken by hand 100 times. Samples were then placed in a heated (65° C.) oven and sampled at the mid-level of the tube after 1 hour, 2 hours or 14 hours of settling time.

TABLE 3

Hg Removal Test Results- South American Crude Oil Storage Tank Bottom Samples

| Additive(s) | Dosage of additives (ppm-v) | Hg content @ 1 hour settling time (ppb) | Hg content @ 2 hour settling time (ppb) | Hg content @ 14 hour settling time (ppb) |
|---|---|---|---|---|
| Untreated Hydrocarbon | | 55,943 | | |
| Mercaptoacetic acid | 200 | 55,552 | | |
| Mercaptoacetic acid + demulsifier + WC2 | 200 + 50 + 20 | 54,054 | | |
| 2-Mercaptoethanol | 200 | 38,381 | | |
| 2-Mercaptoethanol | 500 | | 31,519 | |
| 2-Mercaptoethanol | 2000 | | | 14,306 |
| 2-Mercaptoethanol + demulsifier + WC2 | 200 + 50 + 20 | 32,994 | | |
| Benzenesulfonic acid, 4-C10-13-sec-alkyl derivs. | 150 | 29,147 | | |
| Benzenesulfonic acid, 4-C10-13-sec-alkyl derivs. | 500 | | 38,128 | 38,601 |
| Benzenesulfonic acid, 4-C10-13-sec-alkyl derivs. | 2000 | | | 14,306 |
| Benzenesulfonic acid, 4-C10-13-sec-alkyl derivs. + demulsifier + WC2 | 150 + 50 + 20 | 20,998 | | |

The results from these bottle tests show that applying an additive containing both a sulfur compound of the kind described herein and a suitable demulsifier performs well in removing mercury from hydrocarbon fluids, and that, in general, the addition of a demulsifier and/or water clarifier to the sulfur compound additive reduces mercury levels even more than when the sulfur compound is introduced alone.

In addition, several samples of crude oil containing mercury were treated with various combinations of the metal removal additives and then analyzed for their mercury content. Specifically, the crude oil samples were treated with the varying dosages of the additives identified in column 1 of Table 4. The additives were applied to the crude oil, shaken 100 times, and then 5% by volume water was added to the treated samples before being shaken another 100 times. The hydrocarbon and aqueous phases of the crude oil samples were allowed to separate under ambient conditions. After one (1) hour, a small amount of the oil phase each sample was taken and analyzed for mercury content.

TABLE 4

Hg Removal Test Results-Crude Oil Samples (w/Added Water)

| Additive(s) | Dosage of additives (ppm-v) | Hg in oil (ppb-w) with no water wash |
|---|---|---|
| Untreated Crude Oil | 0 | 699 |
| 2-Mercaptoethanol | 100 | 86 |
| 2-Mercaptoethanol + demulsifier | 100 + 50 | 74 |
| 2-Mercaptoethanol + demulsifier + Water clarifier | 100 + 50 + 20 | 35 |

The results in Table 4 indicate that the demulsifier may help release the mercury particle complexes created by the sulfur compound from the oil phase and that the addition of a water clarifier may help to attract the mercury particle complexes formed by the sulfur compound, which allows them to grow bigger and settle faster from the oil.

Finally, raw crude oil samples were treated with a (1) blended additive comprising mercaptoacetic acid and a glycolic acid buffering agent ("Blend XL 18") in combination with demulsifier and/or an ethylene vinyl acetate copolymer pour point depressant and (2) equal amounts of WC1, WC2, WC3, and WC 4 to evaluate the effectiveness in removing mercury from the raw crude oil samples after a 5% water wash at 150° F. and after 24 hours settling time.

TABLE 5

Hg Removal Test Results with 5% water wash-
Raw Crude Oil Samples (No Added Water)

| Additive(s) | Dosage of additives (ppm-v) | Hg in oil (ppb-w) (Crude oil only) |
|---|---|---|
| Raw Crude Oil | 0 | 54,670 |
| Blend XL18 | 200 | 4,252 |
| Blend XL18/demulsifier | 200/100 | 3,086 |
| Blend XL18/demulsifier/pour point depressant | 200/100/250 | 2,070 |

TABLE 6

Hg Removal Test Results with 5% water wash-
Raw Crude Oil Samples with Water Clarifier only

| Water Clarifier | Dosage of Water Clarifier (ppm-v) | Hg in oil (ppb-w) (Crude oil only) |
|---|---|---|
| Raw Crude Oil | 0 | 669 |
| Water clarifier 1 | 100 | 172 |
| Water clarifier 2 | 100 | 140 |
| Water clarifier 3 | 100 | 165 |
| Water clarifier 4 | 100 | 258 |

The results in Table 5 show that an additive comprising Blend XL 18, formaldehyde, polymer with 4-nonylphenol and oxirane, and a pour point depressant performs the best in removing mercury from raw crude oil compared to samples treated only with Blend XL 18 or treated with Blend XL 18 and formaldehyde, polymer with 4-nonylphenol and oxirane. Table 6 shows that WC2 is the best of the four water clarifiers tested in mercury removal.

In the foregoing specification, the invention has been described with reference to specific embodiments thereof, and has been described as effective in providing methods, additives, and treatments for removing metals from a fluid. However, it will be evident that various modifications and changes can be made thereto without departing from the broader spirit or scope of the invention as set forth in the appended claims. Accordingly, the specification is to be regarded in an illustrative rather than a restrictive sense. For example, fluids, sulfur compounds, demulsifiers, buffering agents, pour point depressants, water clarifiers, functional groups, crosslinkers, mixtures, process conditions and parameters, and the composition and amounts and proportions of additive and components falling within the claimed parameters, but not specifically identified in this disclosure or evaluated in a particular Example, are expected to be within the scope of this invention.

The present invention may suitably comprise, consist or consist essentially of the elements disclosed and may be practiced in the absence of an element not disclosed. For instance, the method or treated fluid may comprise, consist essentially of, or consist of the steps or components recited in the independent claims, respectively. Specifically, there may be provided a method for removing metals from a fluid, the method consisting essentially of or consisting of applying an additive comprising a sulfur compound having the general formula HS—X, where X is a heteroatom substituted alkyl, cycloalkyl, aryl, and/or alkylaryl group, to an aqueous, hydrocarbon, or mixed fluid containing at least one metal to chelate the at least one metal and form a chelate complex of the sulfur compound with the at least one metal, and separating the chelate complex from the fluid. Further there may be provided a treated fluid consisting essentially of or consisting of a fluid comprising at least one metal, and an additive consisting of or consisting essentially of (1) a sulfur compound having the general formula HS—X, where X is a heteroatom substituted alkyl, cycloalkyl, aryl, and/or alkylaryl group, and (2) a component selected from the group consisting of at least one demulsifier, a buffering agent, a water clarifier, a pour point depressant, and combinations thereof.

The words "comprising" and "comprises" as used throughout the claims, are to be interpreted to mean "including but not limited to" and "includes but not limited to", respectively.

As used herein, the singular forms "a," "an," and "the" are intended to include the plural forms as well, unless the context clearly indicates otherwise.

As used herein, the term "about" in reference to a given parameter is inclusive of the stated value and has the meaning dictated by the context (e.g., it includes the degree of error associated with measurement of the given parameter).

As used herein, the term "and/or" includes any and all combinations of one or more of the associated listed items.

What is claimed is:

1. A treated fluid comprising:
   a fluid comprising at least one metal selected from a group consisting of mercury, copper, iron, zinc, aluminum, arsenic, selenium, lithium, silicon, and combinations thereof; and
   an additive comprising:
   a sulfur compound having the general formula HS—X, where X is a heteroatom substituted alkyl, cycloalkyl, aryl, and/or alkylaryl group, where the heteroatom is selected from a group consisting of sulfur, oxygen, phosphorus, and combinations thereof,
a component selected from the group consisting of at least one demulsifier, a buffering agent, a water clarifier, a pour point depressant, and combinations thereof; and
at least one chelate complex of the sulfur compound with the at least one metal.

2. The treated fluid of claim 1, where the fluid comprising at least one metal is selected from the group consisting of crude oil, an oilfield condensate, liquified petroleum gas, natural gas liquid, propane, butane, a refinery distillate, a residual fuel, storage tank sludge, a coke product, natural gas, refinery fuel gas, wastewater, produced water, a chemical process fluid, and combinations thereof.

3. The treated fluid of claim 1, where the sulfur compound is selected from the group consisting of 2-mercaptoethanol; bis (2-mercaptoethyl) sulfide; 2-mercaptoethyl disulfide; 1,8-dimercapto-3,6-dioxaoctane; mercaptoacetic acid; glyceryl monothioglycolate; 2-mercaptophenol; 4-mercaptophenol; 1,2 dithioethane; thiolactic acid; 2,4,6 trithiol; and combinations thereof.

4. The treated fluid of claim 1, where the additive comprises the sulfur compound and a buffering agent selected from a group consisting of glycolic acid, acetic acid, lactic acid, and combinations thereof.

5. The treated fluid of claim 4, where the amount of the sulfur compound in the fluid ranges from about 1 ppm to about 500 ppm per the amount, in ppm, of the at least one metal in the fluid.

6. The treated fluid of claim 1, where the additive comprises the sulfur compound and at least one demulsifier.

7. The treated fluid of claim 1, where the additive comprising the sulfur compound and a water clarifier.

8. The treated fluid of claim 7, where the amount of the water clarifier in the additive ranges from about 0.1 ppm to about 200 ppm, based on the total volume of the fluid.

9. A treated fluid comprising:
a fluid comprising at least one metal selected from a group consisting of mercury, copper, iron, zinc, aluminum, arsenic, selenium, lithium, silicon, and combinations thereof; and
an additive comprising:
from about 1 ppm to about 500 ppm per the amount, in ppm, of the at least one metal in the fluid of a sulfur compound having the general formula HS—X, where X is a heteroatom substituted alkyl, cycloalkyl, aryl, and/or alkylaryl group, where the heteroatom is selected from a group consisting of sulfur, oxygen, phosphorus, and combinations thereof, and
a component selected from the group consisting of at least one demulsifier, a buffering agent, a water clarifier, a pour point depressant, and combinations thereof; and
at least one chelate complex of the sulfur compound with the at least one metal.

10. The treated fluid of claim 9, where the fluid comprising at least one metal is selected from the group consisting of crude oil, an oilfield condensate, liquified petroleum gas, natural gas liquid, propane, butane, a refinery distillate, a residual fuel, storage tank sludge, a coke product, natural gas, refinery fuel gas, wastewater, produced water, a chemical process fluid, and combinations thereof.

11. The treated fluid of claim 9, where the sulfur compound is selected from the group consisting of 2-mercaptoethanol; bis (2-mercaptoethyl) sulfide; 2-mercaptoethyl disulfide; 1,8-dimercapto-3,6-dioxaoctane; mercaptoacetic acid; glyceryl monothioglycolate; 2-mercaptophenol; 4-mercaptophenol; 1,2 dithioethane; thiolactic acid; 2,4,6 trithiol; and combinations thereof.

12. The treated fluid of claim 9, where the additive comprises the sulfur compound and a buffering agent selected from a group consisting of glycolic acid, acetic acid, lactic acid, and combinations thereof.

13. The treated fluid of claim 9, where the additive comprises the sulfur compound and at least one demulsifier.

14. The treated fluid of claim 9, where the additive comprising the sulfur compound and a water clarifier.

15. A treated fluid comprising:
a fluid comprising at least one metal selected from a group consisting of mercury, copper, iron, zinc, aluminum, silicon, and combinations thereof, where the fluid comprising at least one metal is selected from the group consisting of crude oil, an oilfield condensate, liquified petroleum gas, natural gas liquid, propane, butane, a refinery distillate, a residual fuel, storage tank sludge, a coke product, natural gas, refinery fuel gas, wastewater, produced water, a chemical process fluid, and combinations thereof; and
an additive comprising:
a sulfur compound selected from the group consisting of 2-mercaptoethanol; bis (2-mercaptoethyl) sulfide; 2-mercaptoethyl disulfide; 1,8-dimercapto-3,6-dioxaoctane; mercaptoacetic acid; glyceryl monothioglycolate; 2-mercaptophenol; 4-mercaptophenol; 1,2 dithioethane; thiolactic acid; 2,4,6 trithiol, and combinations thereof;
a component selected from the group consisting of at least one demulsifier, a buffering agent, a water clarifier, a pour point depressant, and combinations thereof; and
at least one chelate complex of the sulfur compound with the at least one metal.

16. The treated fluid of claim 15, where the amount of the sulfur compound in the fluid ranges from about 1 ppm to about 500 ppm per the amount, in ppm, of the at least one metal in the fluid.

* * * * *